US007873752B2

(12) United States Patent
Yoshida

(10) Patent No.: US 7,873,752 B2
(45) Date of Patent: Jan. 18, 2011

(54) HANDLING PROCEDURE INSTRUCTION DEVICE AND METHOD OF INSTRUCTING HANDLING PROCEDURE, AND PROGRAM AND RECORDING MEDIUM THEREOF

(75) Inventor: Kazuhiro Yoshida, Sagamihara (JP)

(73) Assignee: Olympus Corporation, Tokyo (JP)

( * ) Notice: Subject to any disclaimer, the term of this patent is extended or adjusted under 35 U.S.C. 154(b) by 561 days.

(21) Appl. No.: 11/901,856

(22) Filed: Sep. 19, 2007

(65) Prior Publication Data

US 2008/0071937 A1   Mar. 20, 2008

(30) Foreign Application Priority Data

Sep. 20, 2006   (JP)   ............................ P2006-254459
Dec. 28, 2006   (JP)   ............................ P2006-353928

(51) Int. Cl.
*G06F 3/00* (2006.01)
(52) U.S. Cl. ......................................................... 710/8
(58) Field of Classification Search ...................... 710/8
See application file for complete search history.

(56) References Cited

U.S. PATENT DOCUMENTS

| 6,301,012 | B1 * | 10/2001 | White et al. ................ 358/1.15 |
| 2002/0194414 | A1 | 12/2002 | Bateman et al. | |
| 2004/0070681 | A1 | 4/2004 | Battles et al. | |
| 2005/0225666 | A1 * | 10/2005 | Katakai ....................... 348/373 |

FOREIGN PATENT DOCUMENTS

| JP | 10-091402 A | 4/1998 |
| JP | 2004-013836 A | 1/2004 |
| JP | 2006-67486 A | 3/2006 |
| WO | WO 2004/049693 A1 | 6/2004 |

OTHER PUBLICATIONS

International Search Report dated Jun. 19, 2008, issued in a counterpart International Application.

* cited by examiner

*Primary Examiner*—Henry W Tsai
*Assistant Examiner*—Juanito C Borromero
(74) *Attorney, Agent, or Firm*—Holtz, Holtz, Goodman & Chick, PC

(57) ABSTRACT

The present invention relates to a handling procedure instruction device that displays information on a handling procedure of electronic equipment only when a user is not familiar with the handling procedure of the electronic equipment. The device determines whether or not the equipment is connected with the instruction device, and then reads, from the equipment, information on whether or not the handling procedure of the equipment is known to the user of the equipment to determine whether or not an instruction for the handling is require. If it wads information indicating that the handling procedure of the equipment is known to the user of the equipment, the device aborts a display process of previously-stored handling procedure instruction information. If the display process of the previously-stored handling procedure instruction information is aborted, the device displays information to be displayed after the handling procedure instruction information on a display portion. According to the present invention, it is possible to reduce needless operations by a user who is familiar with the handling procedure.

16 Claims, 7 Drawing Sheets

FIG. 5

1. PRESS "NEXT" BUTTON TO DISPLAY HANDLING PROCEDURE INSTRUCTION INFORMATION.

2. REMOVE IMAGE TAKING DEVICE FROM CRADLE TO SKIP DISPLAY OF HANDLING PROCEDURE INSTRUCTION INFORMATION.

NEXT

HANDLING PROCEDURE INSTRUCTION DEVICE AND METHOD OF INSTRUCTING HANDLING PROCEDURE, AND PROGRAM AND RECORDING MEDIUM THEREOF

CROSS-REFERENCE TO RELATED APPLICATIONS

This application claims priority from Japanese Patent Application Nos. 2006-254459 (filed on Sep. 20, 2006) and 2006-353928 (filed on Dec. 28, 2006), the disclosure of which is incorporated herein by reference.

BACKGROUND OF THE INVENTION

1. Field of the Invention

The present invention relates to a handling procedure instruction device that displays handling procedure information for instructing a handling procedure of equipment and a method of instructing a handling procedure, and a program and recording medium thereof.

2. Description of the Related Art

Electronic equipment is increasingly used in the form of being connected with a terminal such as a PC (Personal Computer). For example, a user can take a picture of an object with a digital camera, and connect the digital camera to a PC. A digital image of the object can be transferred to the PC. The user can display the image on the PC and view it. Electronic equipment includes various devices other than digital cameras. Devices requiring complicated operation are expected to be more often used by being connected with a terminal such as a PC. When such a device requiring complicated operation is connected with a PC and used, it is required that a handling procedure for the electronic device should be displayed on a terminal, such as a PC, every time the device is used in order to make the user familiar with the handling procedure of the electronic device. Here, a technique for displaying a handling procedure (or operation procedure) on a terminal such as a PC is conventionally used. For example, Japanese Unexamined Patent Application, First Publication No. 2006-67486 discloses processes of displaying an operation instruction window of the application program installed on the PC.

However, for a user who is familiar with the operation of the electronic device, it is unnecessary to display the handling procedure since he or she does not need to read the information on the handling procedure. Moreover, when it is unnecessary to display the information on the handling procedure on such a terminal, it is necessary to prompt the user to skip the display of the information on the handling procedure. In that case, it is desirable that the terminal determine whether or not the user is familiar with the handling procedure and skip the display of the information on the handling procedure to reduce burden on the user.

SUMMARY OF THE INVENTION

Therefore, it is an object of the present invention to provide a handling procedure instruction device and method of instructing a handling procedure that can reduce needless operations of a user who is familiar with the handling procedure of electronic equipment by displaying the information on the handling procedure only when the user is not familiar with the equipment, and to provide a program and recording medium thereof.

To achieve the above object, the first aspect of the present invention is a handling procedure instruction device that displays handling procedure instruction information for equipment, including: an instruction requirement determinator that reads information from the equipment on whether or not the handling procedure of the equipment is known to a user of the equipment to determine whether or not a handling instruction is required; an instruction abortion unit that aborts display processing of the previously-stored handling procedure instruction information if information indicating that the handling procedure of the equipment is known to the user of the equipment is read; and a display processor that displays information to be displayed after the handling procedure instruction information on a display portion if the display processing of the handling procedure instruction information is aborted.

Furthermore, the first aspect of the present invention is the above-described handling procedure instruction device, further including a connection detector for determining whether or not the equipment is connected with the instruction device, in which if the equipment is connected with the instruction device, the instruction requirement determinator reads information on whether or not the handling procedure of the equipment is known to the user of the equipment to determine whether or not a handling instruction is required.

Furthermore, the first aspect of the present invention is the above-described handling procedure instruction device, in which if information indicating that the handling procedure of the equipment is known to the user of the equipment cannot be read, the display processor displays the handling procedure instruction information; the connection detector detects a connection of the equipment to the instruction device, while the handling procedure instruction information is displayed; and the instruction requirement determinator reads information on whether or not the handling procedure of the equipment is known to the user of the equipment to determine whether or not a handling instruction is required, while the handling procedure instruction information is displayed, and in which if information indicating that the handling procedure of the equipment is known to the user is read while the handling procedure instruction information is displayed, the instruction abortion unit determines to abort display of the handling procedure instruction information, and the display processor displays information to be displayed after the handling procedure instruction information on a display portion.

Furthermore, the first aspect of the present invention is the above-described handling procedure instruction device, in which if the connection detector detects removal of the equipment from the instruction device while the handling procedure instruction information is displayed, the instruction abortion unit decides to abort display of the handling procedure instruction information.

Furthermore, the first aspect of the present invention is a handling procedure instruction device that displays handling procedure instruction information of an image taking device, including: an instruction requirement determinator that determines whether or not an image is recorded in the image taking device to determine whether or not a handling instruction is required; an instruction abortion unit that aborts display processing of the previously-stored handling procedure instruction information if the image is recorded in the image taking device; and a display processor that displays information to be displayed after the handling procedure instruction information on a display portion if the display processing of the handling procedure instruction information is aborted.

The first aspect of the present invention is the above-described handling procedure instruction device, including: a connection detector that determines whether or not the image taking device is connected with the instruction device, and the instruction requirement determinator determines whether or not an image is recorded in the image taking device to determine whether or not a handling instruction is required, if the equipment is connected with the instruction device.

Furthermore, the first aspect of the present invasion is the above-described handling procedure instruction device, in which if no image is recorded in the image taking device, the display processor displays the handling procedure instruction information; the connection detector detects a connection of the image taking device to the instruction device, while the handling procedure instruction information is displayed; and the instruction requirement determinator determines whether or not an image is recorded in the image taking device to determine whether or not a handling instruction is required, while the handling procedure instruction information is displayed, and in which if an image is recorded in the image taking device while the handling procedure instruction information is displayed, the instruction abortion unit determines to abort display of the previously-stored handling procedure instruction information, and the display processor displays information to be displayed after the handling procedure instruction information on the display portion.

Furthermore, the first aspect of the present invention is the above-described handling procedure instruction device, in which if the connection detector detects removal of the image taking device from the instruction device while the handling procedure instruction information is displayed, the instruction abortion unit aborts display of the handling procedure instruction information.

Furthermore, the second aspect of the present invention is a method of instructing a handling procedure in a handling procedure instruction device that displays handling procedure instruction information of equipment, in which an instruction requirement determinator of the handling procedure instruction device reads whether or not a handling procedure of the equipment is known to a user of the equipment to determine whether or not a handling instruction is required, in which if information indicating that the handling procedure of the equipment is known to the user of the equipment is read, an instruction abortion unit of the handling procedure instruction device aborts display of the previously-stored handling procedure instruction information, and in which if the display process of the handling procedure instruction information is aborted, a display processor of the handling procedure instruction device displays, on a display portion, information to be displayed after the handling procedure instruction information.

Furthermore, the second as of the present invention is the above-described method of instructing a handling procedure, in which, a connection detector of the handling procedure instruction device determines whether or not the equipment is connected with the instruction device, and in which if the equipment is connected with the instruction device, the instruction requirement determinator of the handling procedure instruction device reads information from the equipment on whether or not a handling procedure of the equipment is known to the user of the equipment to determine whether or not an instruction is required.

Furthermore, the second aspect of the present invention is the above-described method of instructing a handling procedure, in which if information indicating that the handling procedure of the equipment is known to the user of the equipment cannot be read, the display processor displays the handling procedure instruction information; the connection detector detects a connection of the equipment to the instruction device, while the handling procedure instruction information is displayed; and the instruction requirement determinator reads information on whether or not the handling procedure of the equipment is known to the user of the equipment from the equipment to determine whether or not a handling instruction is required, while the handling procedure instruction information is displayed, and in which if information indicating that the handling procedure of the equipment is known to the user of the equipment is read while the handling procedure instruction information is displayed, the instruction abortion unit decides to abort display of the handling procedure instruction information, and the display processor displays information to be displayed after the handling procedure instruction information on the display portion.

Furthermore, the second aspect of the present invention is the above-described method of instructing a handling procedure, in which if the connection detector detects removal of the image taking device from the instruction device while the handling procedure instruction information is displayed, the instruction abortion unit decides to abort display of the handling procedure instruction information.

Furthermore, the third aspect of the present invention is a program to allow a computer of a handling procedure instruction device that displays handling procedure instruction information of equipment to execute processes including: an instruction requirement determination process that reads information from the equipment on whether or not a handling procedure of the equipment is known to a user of the equipment from the equipment to determine whether or not a handling instruction is required; an instruction abortion process that aborts display processing of the previously-stored handling procedure instruction information if information indicating that the handling procedure of the equipment is known to the user of the equipment is read; and a display process that displays information to be displayed after the handling procedure instruction information on a display portion if the display processing of the handling procedure instruction information is aborted.

Furthermore, the third aspect of the present invention is a program further including, in addition to the above-described processes, a connection detection process that determines whether or not the equipment is connected with the instruction device, the program allowing, if the equipment is connected with the instruction device in the instruction requirement determination process, the computer to execute a process that reads information from the equipment on whether or not the handling procedure of the equipment is known to the user of the equipment to determine whether or not a handling instruction is required.

Furthermore, the third aspect of the present invention is a program that, in addition to the above-described processes, executes and displaying information to be displayed after the handling procedure instruction information in the display process on a display portion: if information indicating that the handling procedure of the equipment is known to the user of the equipment cannot be read in the display process, displaying the handling procedure instruction information; detecting a connection of the equipment to the instruction device in the connection detection process, while the handling procedure instruction information is displayed; and reading information from the equipment on whether or not the handling procedure of the equipment is known to the user of the equipment to determine whether or not a handling instruction is required, in the instruction requirement determination process while the handling procedure instruction information is displayed, and if information, indicating that the handling procedure of the equipment is known to the user of the equipment is read while the handling procedure instruction information is displayed, the program decides to stop displaying the handling procedure instruction information in the display process.

Furthermore, the third aspect of the present invention is a program that, in addition to the above-described processes, aborts display of the handling procedure instruction information in the instruction abortion process if removal of the equipment from the instruction device is detected in the connection detection process while the handling procedure instruction information is displayed.

Furthermore, the forth aspect of the present invention is a computer readable recording medium that stores any one of the above-described programs.

BRIEF DESCRIPTION OF THE DRAWINGS

FIG. 5 is a reference diagram of a screen displayed on a monitor in step S106.

DETAILED DESCRIPTION OF THE INVENTION

Figure 1:
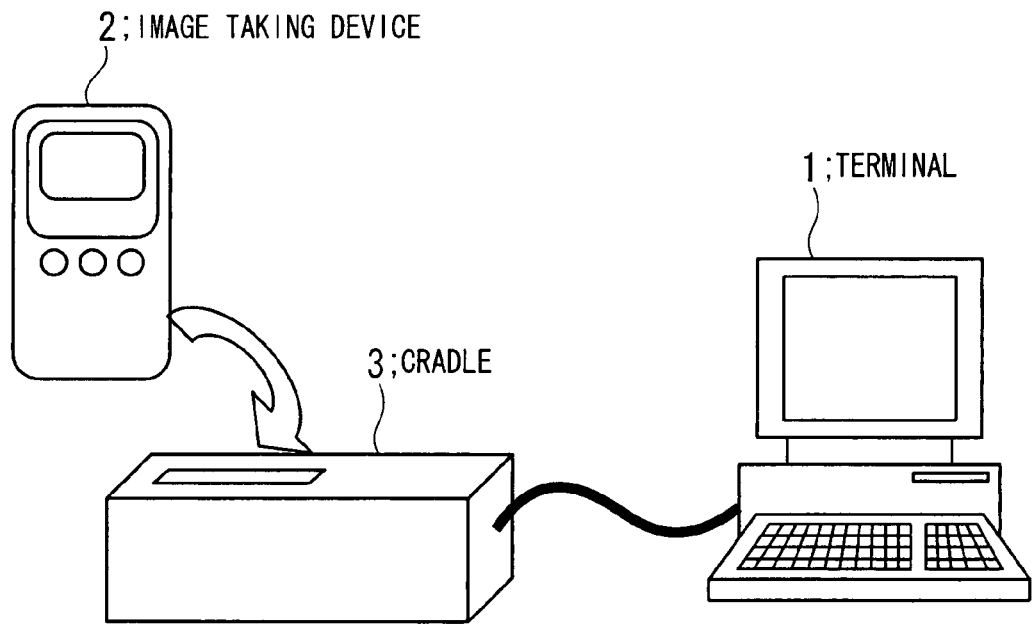
FIG. 1 is a block diagram showing a configuration of an image taking system.

Hereunder is a description of an image taking system according to a first embodiment with reference to the drawings. FIG. 1 is a block diagram showing a configuration of an image taking system according to the first embodiment. In the figure, reference numeral 1 denotes a terminal (a handling procedure instruction device). Reference numeral 2 denotes an image taking device (equipment). Reference numeral 3 denotes a cradle for connecting the image taking device 2 with the terminal 1. A user utilizes the image taking device 2 to capture an image of an object. After capturing the image, the user connects the image taking device 2 with the cradle 3. This connection allows the image taking device 2 to transfer the image data of the object the user has captured the image to the terminal 1.

Prior to the capturing an image (use of the image taking device 2), the terminal 1 determines whether or not the user who uses the image taking device 2 is familiar with the handling procedure of the image taking device 2. If it determines that the user does not know the handling procedure, it displays information on the handling procedure of the image taking device 2 (hereinafter, referred to as handling procedure instruction information). To be more specific, by detecting that predetermined operation has been performed in response to a direction displayed on the screen, the terminal 1 determines that the user does not know the handling procedure of the image taking device 2, and displays the handling procedure instruction information on the screen. On the other hand, if it determines that the user who is using the image taking device 2 knows the handling procedure of the image taking device 2, the terminal 1 skips the display of the handling procedure instruction information to perform a process of displaying the next information. These processes by the terminal 1 can prevent the user who is familiar with the handling procedure of the image taking device 2 from performing needless operations (for example, an operation of inputting change to the next page). In the first embodiment, the image tang device 2 is, for example, a portable device for capturing the image of a tooth/row of teeth utilized in dentists offices, and is provided with the function of a spectrophotometer. Therefore, the image taking device 2 performs calibration (color adjustment) before taking an image of a tooth/row of teeth.

Figure 2:
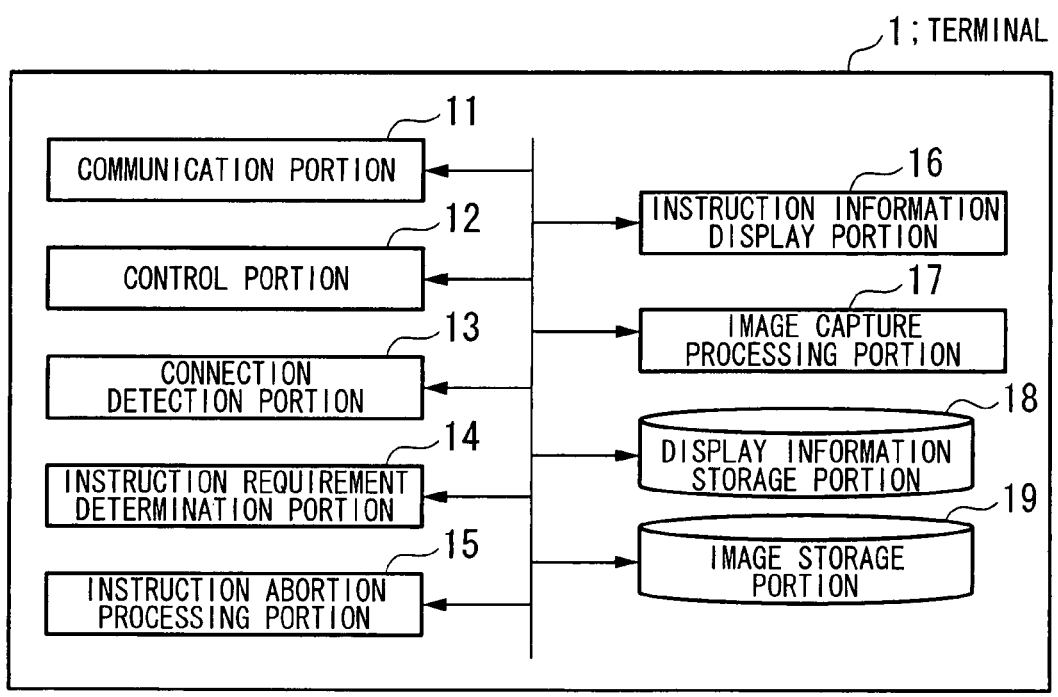
FIG. 2 is a functional block diagram of a terminal.

FIG. 2 is a functional block diagram of the terminal.

As shown in the figure, the terminal 1 is provided with a communication portion 11 that communicates with the cradle 3, a control portion 12 that controls individual processing portions in the terminal 1, a connection detection portion 13 that detects a connection of the image taking device 2 to the cradle 3, an instruction requirement determination portion 14 that determines whether or not to display the handling procedure instruction information based on the information stored in the image taking device 2, an instruction abortion processing portion 15 that aborts the display of the handling procedure instruction information currently displayed, an instruction information display portion 16 that displays the handling procedure instruction information, an image capture processing portion 17 that captures the data of an image stored in the image taking device 2, a display information storage portion 18 that stores the handling procedure instruction information and the like, and an image storage portion 19 that store the captured image data. The above-mentioned individual processing portions and the like are provided in the terminal 1 to be executed by an application program for capturing images which is stored in the terminal 1.

Figure 3:
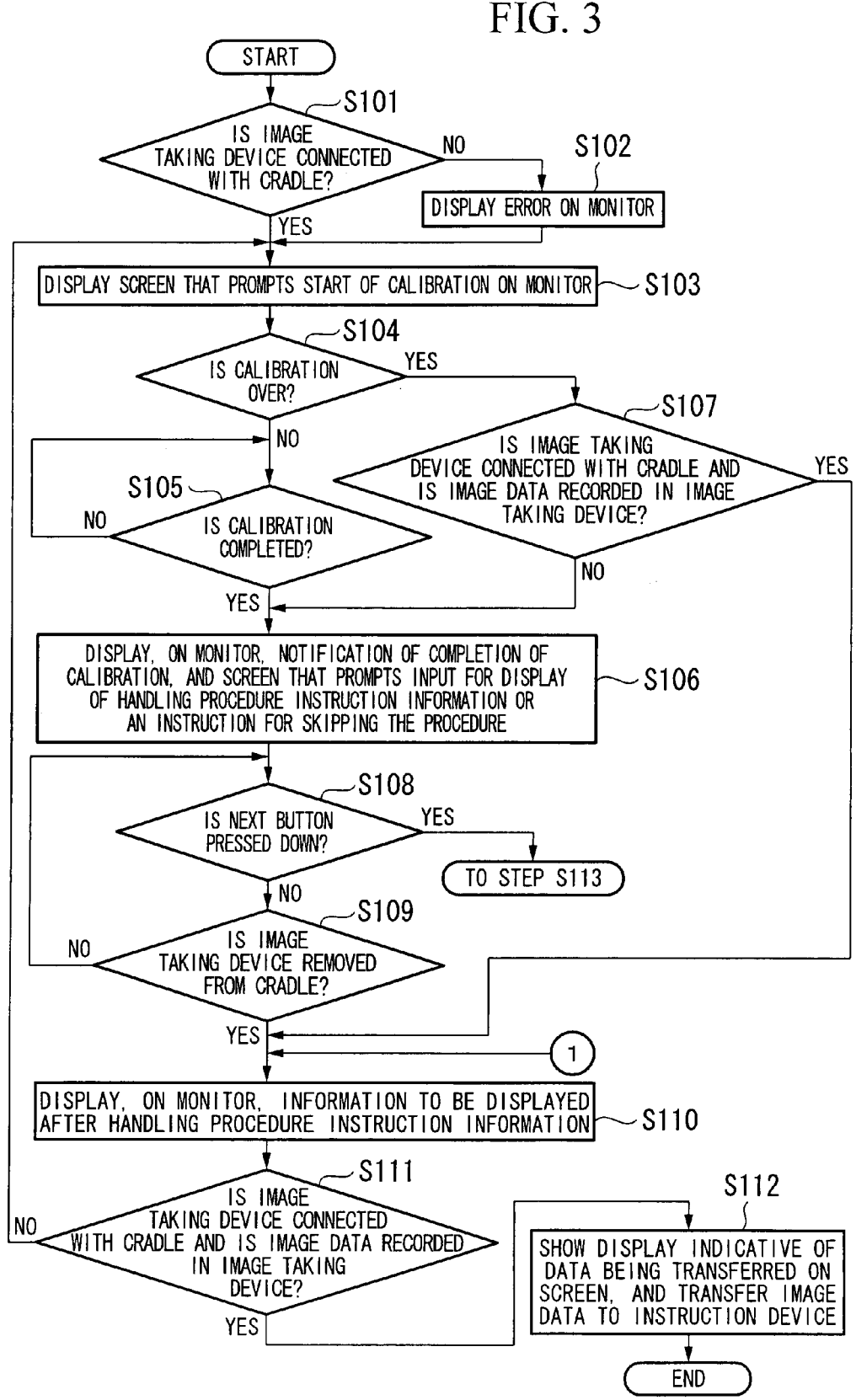
FIG. 3 is a first diagram showing a process flow of a term according to a first embodiment.

FIG. 3 is a first diagram showing a process flow of a terminal according to the first embodiment.

Figure 4:
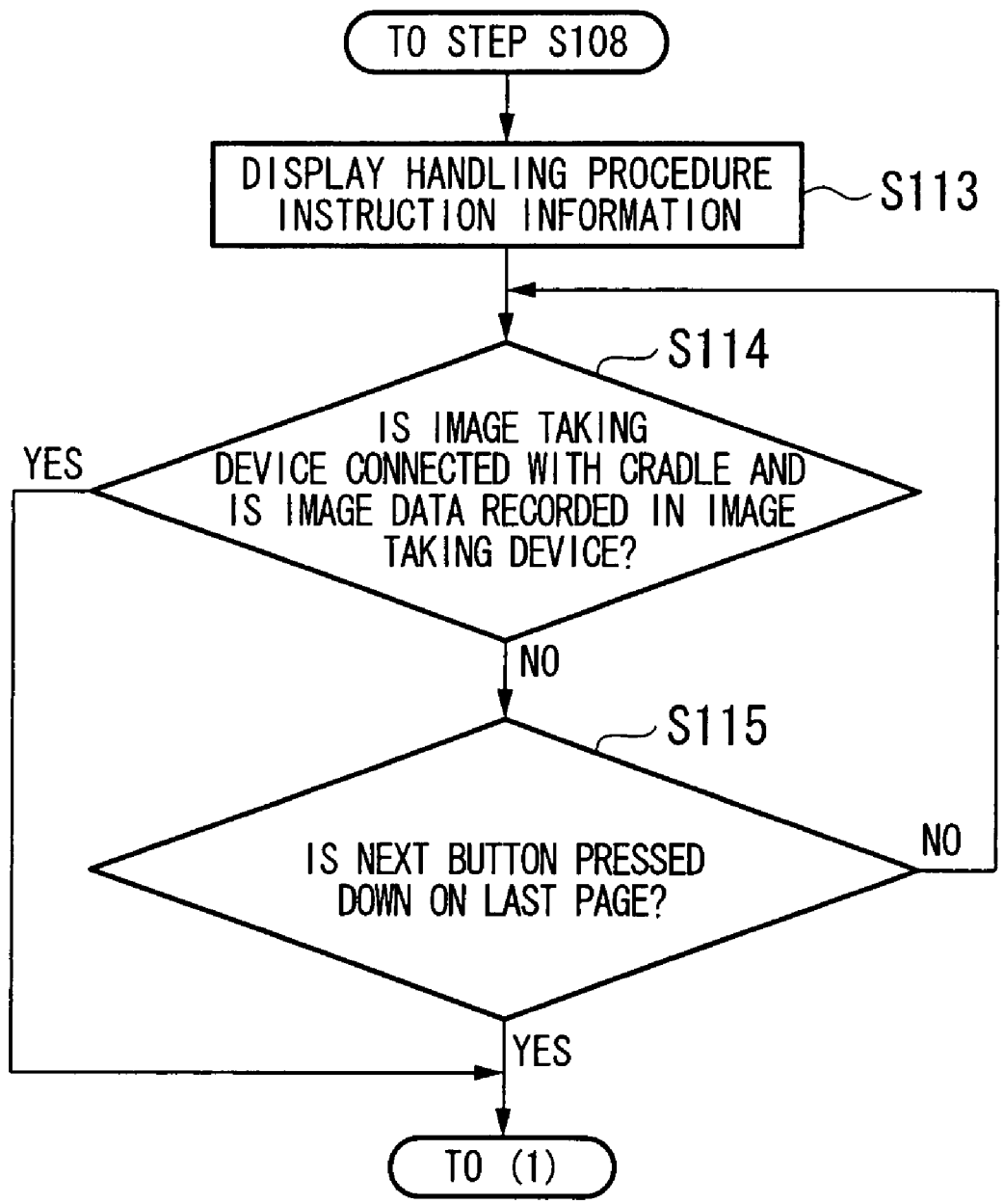
FIG. 4 is a second diagram showing a process flow of the terminal according to the first embodiment.

FIG. 4 is a second diagram showing a process flow of the terminal according to the first embodiment.

Next is a sequential description of a process flow of a terminal provided with the function of the handling procedure instruction device according to the first embodiment with reference to FIG. 3 and FIG. 4.

First, the connection detection portion 13 of the terminal 1 determines whether or not the image taking device 2 is connected with the terminal 1 via the cradle 3 (step S101). If the image taking device 2 is not connected with the terminal 1 via the cradle 3, the terminal 1 displays an error on the monitor (step S102). If the image taking device 2 is connected with the terminal 1 via the cradle 3, the terminal 1 displays a screen on the monitor that prompts the start of calibration (step S103).

Here, in step S102, only an error display is performed and it is not confirmed whether or not the user has actually connected the image taking device 2 with the cradle 3. However, calibration can be performed only in the state with the image taking device 2 connected with the cradle 3.

That is, in the image taking system, a reference plate used for calibration is arranged on the cradle 3 side. To capture the image of the reference plate with the image taking device 2, the image taking device 2 should be arranged in a predetermined position of the cradle 3. Therefore, prompting the user to start calibration in step S103 connects the image taking device 2 with the cradle 3.

However, even if the user is prompted to start calibration in step S103, it is uncertain whether or not the user has actually connected the image taking device 2 with the cradle 3. Therefore, it is determined whether or not the calibration is over (step S104). If the calibration is over, information that the calibration has completed is stored in the memory of the image taking device 2. The determination of whether or not the calibration is over is based on the information stored in the memory of the image taking device 2. Therefore, unless the image taking device 2 is connected with the cradle 3, the terminal 1 cannot read the information stored in the memory.

If the terminal 1 cannot read the information stored in the memory, a series of the processes is in the waiting state (the state in which the process proceeds to neither Yes nor No in step S104. However, FIG. 3 does not show the process relating to the waiting state). As a result, to exit the waiting state, the user finally connects the image taking device 2 with the cradle 3.

When the image taking device 2 is connected with the cradle 3, the terminal 1 reads the information stored in the memory. If the calibration is over, the process proceeds to the process of step S107. The process of step S107 will be described later. On the other hand, if the calibration is not over, the process waits until the calibration is completed (step S105). That is, as described above, the display that prompts the user to start calibration appears in step S103. The user who has seen this display presses down the redetermined button of the image taking device 2 to direct the start of the calibration if he or she takes a picture of an object by use of the image taking device 2. The image taking device 2 then starts the calibration. When the calibration is completed, the image taking device 2 stores the information indicating that it has been completed in the memory or the like.

Here, the instruction requirement determination portion 14 of the terminal 1 reads the information (the information indicating the completion of the calibration) recorded in the memory of the image taking device 2 via the cradle 3 at predetermined time intervals to decide whether or not the calibration has completed. If the information recorded in the memory is not the information indicating the completion of the calibration, the instruction requirement determination portion 14 determines that the calibration is not over and repeats the determination process of whether or not the calibration has completed (step S105). If the calibration has completed, the instruction requirement determination portion 14 notifies the user of the completion of the calibration and displays on the monitor a screen that prompts an input for the display of the handling procedure instruction information or an instruction for skipping the procedure (step S106).

FIG. 5 is a reference diagram schematically showing a screen displayed on the monitor in step S106.

For example, as shown in FIG. 5, this screen shows an instruction that prompts to pressing down the "NEXT" button on the screen and an inspection that prompts to remove the image taking device 2 from the cradle 3. Here, the instruction that prompts to press down the "NEXT" button is a notification to the user that the handling procedure instruction information will be displayed. On the other hand, the instruction that prompts to remove the image taking device 2 from the cradle 3 is a notification to the user that the display of the handling procedure instruction information will be skipped.

After the process of step S106, the instruction requirement determination portion 14 of the terminal 1 determines whether or not the NEXT button is pressed down (step S108) and whether or not the image taking device 2 is removed from the cradle 3 (step S109). If it determines that the NEXT button is not pressed down and that the image taking device 2 is removed, the instruction requirement determination portion 14 determines that it is not necessary to display the handling procedure instruction information and directs the instruction abortion processing portion 15 to abort the handling procedure instruction information. The instruction abortion processing portion 15 then directs the instruction information display portion 16 to display the information to be displayed after the handling procedure instruction information, for example to display the information of the screen that prompts the start of an image capture. The instruction information display portion 16 then reads the information of the screen that prompts the start of an image capture from the display information storage portion 18 and displays it on the monitor (step S110). The user uses the image taking device 2 to capture an image of an object according to the information of the screen that prompts the start of an image capture. After completion of the image capturing, the user reconnects the image taking device 2 with the cradle 3. According to the degree of familiarity of the user (the degree of familiarity with the image taking device 2), an image capturing may be performed before step S110 is displayed. In this case, capturing an image is performed by the user while step S109 and S110 are processed.

After completion of step S110, the image capture processing portion 17 of the terminal 1 determines whether or not the image taking device 2 is connected with the cradle 3, and besides, whether or not image data is recorded in the memory of the image taking device 2 (step S111). To determine whether or not image data is recorded in the memory of the image taking device 2, it is necessary that the terminal 1 can refer to the memory of the image taking device 2. Therefore, this determination is premised on the fact that the image taking device 2 is in connection with the cradle 3. That is, the determination condition in step S111 may be only whether or not image data is recorded in the memory of the image taking device 2. If image data is recorded in the memory of the image taking device 2, a display indicating that the data is being transferred is shown on the screen and the image data recorded in the memory is transferred to the terminal 1 (step S112). This allows the terminal 1 to perform the next process using the image data (for example, recording to the memory). If image data is recorded in the memory of the image taking device 2 in step S111, the process returns to step S103.

According to the above processing, by detecting that the NEXT button is not pressed down in the step S108 and that the image taking device 2 is removed from the cradle 3 without a display of the handing procedure instruction information, the terminal 1 can determine that the user is familiar with the handling procedure of the image taking device 2 and that it is not necessary to display the handling procedure instruction information. Therefore, in cases like this, in the terminal 1 with the function of a handling procedure instruction device, the handling, procedure instruction information is aborted and the next information is displayed.

As a result, for a user who can be determined as familiar with the handling procedure of the image taking device 2, the effort for operation on the terminal 1 (handling procedure instruction device) (for example, operation of inputting change to the next page) can be reduced. That is, only one operation of removing the image taking device 2 from the cradle 3 allows the user to shift to a shooting of an object and at the same time to send to the terminal 1 a signal indicating that the display of the handling procedure instruction information is not required. This eliminates the necessity for the user to newly issue a direction to skip the display of the handling procedure instruction information of the image taking device 2. Therefore, the burden on the user to operate the terminal 1 can be reduced.

Next is a description of step S107. If information indicates the completion of the calibration in step S104, the instruction requirement determination portion 14 of the terminal 1 determines that the calibration is over. At this time, the image taking device 2 is connected with the cradle 3. Therefore, the terminal 1 determines whether or not image data is recorded in the memory of the image taking device 2 (step S107). In the determination in step S107, instruction requirement determination portion 14 determines whether or not image data is recorded in the memory of the image taking device 2 at predetermined time intervals. If no image data is recorded, there is a possibility that the user has little experience in using the image taking device 2. Therefore, if no image data is recorded the process shifts to step S106. On the other hand in step S107, if the instruction requirement determination portion 14 determines that image data is recorded in the memory of the image taking device 2, the terminal 1 shifts the process to step S110. That is, because it is assumed that an object has already been captured by the image taking device 2, the display of the handling procedure instruction information is skipped to start a process of image transfer to the terminal 1. This can reduce the effort of the user to operate on the terminal 1 (the handling procedure instruction device).

Furthermore, a process in the terminal 1 will be described in the case where the NEXT button is pressed down in step S108, that is, the user wants to display the handling procedure instruction information. After step S108, the instruction requirement determination portion 14 of the terminal 1 directs the instruction information display portion 16 to display the handling procedure Instruction information. The instruction information display portion 16 then displays the handling pie instruction information on the monitor of the terminal 1 (step S113). Here, the handing procedure instruction information consists of a plural pages of screen information. Therefore, the user operates the image taking device 2 while reading through the instructions written on the individual pages to capture an image of an object. At this time, the user, when finishing reading the instruction on the first page, presses down the NEXT button displayed on the screen to input a direction to display the next page to the terminal 1. In this manner, if the user does not know the operation procedure of the image taking device 2, the handling procedure instruction information is displayed without being skipped. Therefore, the user can operate according to the handling procedure instruction information.

While the handling procedure instruction information is displayed, the instruction abortion processing portion 15 of the terminal 1 determines whether or not the image taking device 2 is connected with the cradle 3, and also, whether or not image data is recorded in the memory of the image taking device 2 (step S114). If the image taking device 2 is not connected with the cradle 3 or image data is not recorded in the memory of the image taking device 2, it follows that the capturing the image by the user is not performed. Therefore, subsequently, it is determined whether or not the NEXT button is pressed down on the last page (step S115).

If the NEXT button on the last page displayed in the handling procedure instruction information is pressed down, the terminal 1 shifts the process to step S110. On the other hand, if the NEXT button on the last page is not pressed down, the terminal 1 displays the handling procedure instruction information of the next page.

If the image taking device 2 is connected with the cradle 3 and image data is recorded in the memory of the image taking device 2, it follows that an image capturing by the user is performed. In this case, it is assumed that an image of an object has already been captured by the image taking device 2. Therefore, the display of the handling procedure instruction information is skipped to start a process of image transfer to the terminal 1. This can reduce burden on the user to operate the terminal 1 (the handling procedure instruction device).

In the first embodiment, the terminal 1 provided with the function of a handling procedure instruction device determines whether or not the display of the handling procedure instruction information is required based on the process of step S107, that is, whether or not image data is stored in the memory of the image taking device 2. If the electronic equipment which the user uses for capturing the image is electronic equipment other than the image taking device 2, it is determined whether or not information suitable for the electronic equipment is recorded in the electronic equipment. Based on the results of this determination, it may be determined whether or not the handling procedure of the electronic equipment is known to the user who handles the equipment; and then, based on this result, it may be determined whether or not the handling procedure instruction information is displayed. In the first embodiment, the terminal 1 provided with the function of a handling procedure instruction device determines whether or not the display of the handling procedure instruction information is required based on the process of step S109; that is, whether or not the image taking device 2 is removed from the cradle. If the electronic equipment is electronic equipment other than the image taking device 2, it is determined whether or not the image taking device 2 is removed from a device suitable for the electronic equipment. Based on the results of this determination, it may be determined whether or not the handling procedure of the electronic equipment is known to the user who handles the equipment; and then, based on this result, it may be determined whether or not to display the handling procedure instruction information.

Figure 6:
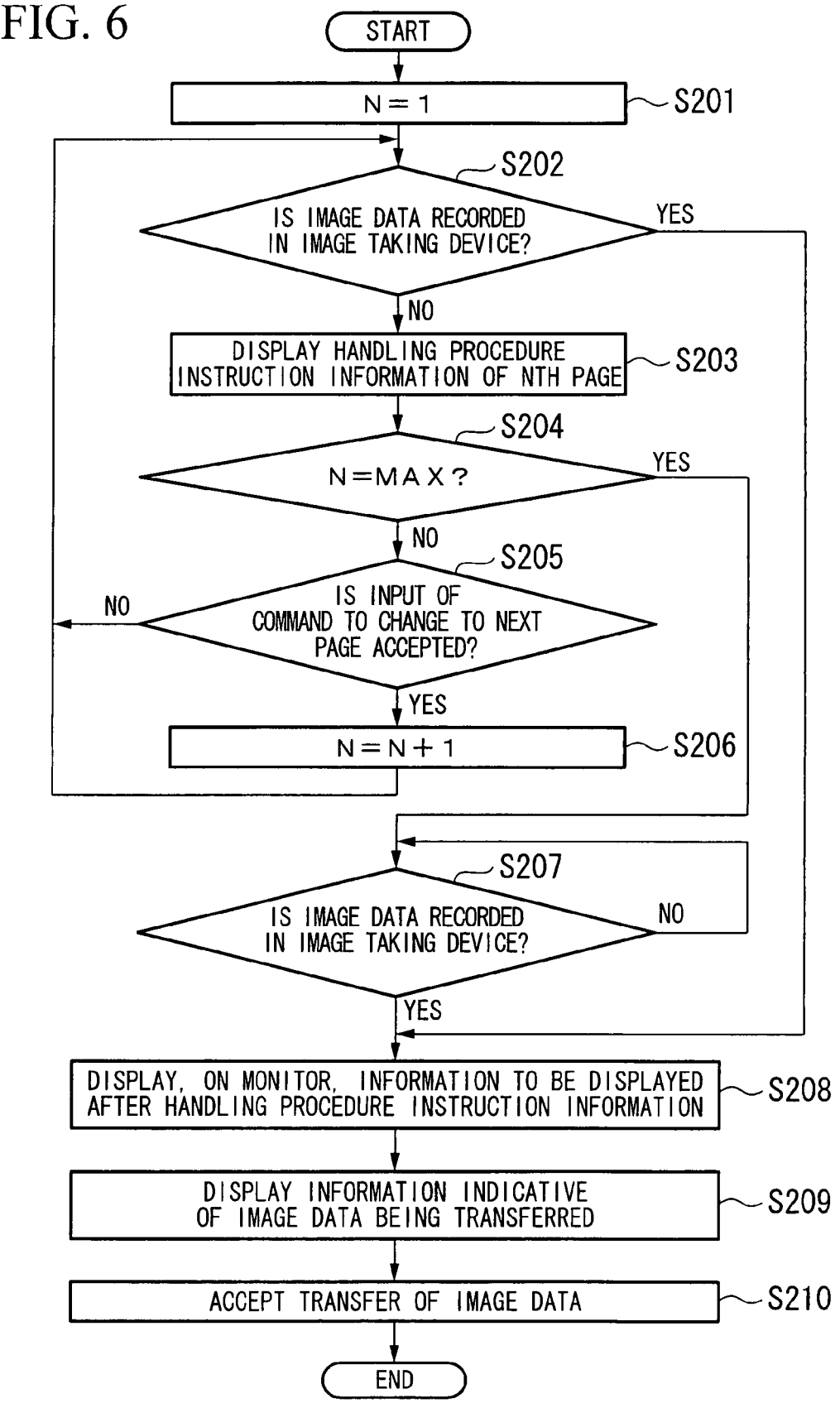
FIG. 6 is a diagram showing a process flow of a terminal according to a second embodiment.

FIG. 6 is a diagram showing a process flow of a terminal according to a second embodiment.

Next is a sequential description of a process flow of a terminal provided with the function of the handling procedure instruction device according to the second embodiment with reference to FIG. 6. The terminal 1 of the second embodiment is an example of one without the function of the connection detection portion 13 of the terminal 1 of the first embodiment. Therefore, the individual functional portions other than the connection detection portion 13 will be denoted by the same reference symbols as those in the first embodiment.

First, in the initial state of the instruction requirement determination portion 14, 1 is assigned to N (N denotes the number of pages of the handling procedure instruction information. In this embodiment, the last page of the handling procedure instruction information is N=5.) and it is stored in the memory or the like (step S201). The instruction requirement determination portion 14 of the terminal 1 accesses the image taking device 2 via the cradle 3 and then determines whether or not image data is recorded in the memory of the image taking device 2 (step S202). In the determination in step S202, the instruction requirement determination portion 14 determines whether or not image data is recorded in the memory of the image taking device 2. If no image data is found, the process is shifted to step S203; if image data is recorded, the process is shifted to step S208. Note that the number of accesses to the image taking device 2 may be one, or a plurality of times at predetermined time intervals.

Further description will be made of the case where, in the determination in step S202, it is determined that image data is recorded in the memory of the image taking device 2. If image data is recorded in the memory of the image taking device 2, it indicates that the user has used the image taking device 2. Therefore, it is possible to determine that the user is familiar with how to use the image taking device 2. As a result, the terminal 1 directs the instruction abortion processing portion 15 to abort the handling procedure instruction information. The instruction abortion processing portion 15 then directs the instruction information display portion 16 to display the information to be shown after the handling procedure instruction information. The instruction information display portion 16 then reads the information to be displayed after the handling procedure instruction information from the display information storage portion 18 and displays it on the monitor (step S208). Moreover, the image capture processing portion 17 displays on the monitor the information indicating that the image data is being transferred to the terminal 1 (step S209) and accepts the transfer of the image data from the image taking device 2 (step S210).

In this manner, for a user who is familiar with the handling procedure of the image taking device 2, a burden on operation on the terminal 1 (handling procedure instruction device) (for example, operation of inputting change to the next page) can be reduced because the display of the handling procedure instruction information is skipped.

Next is a description of the case where it is determined, in the determination in step S202, that image data is not recorded in the memory of the image taking device 2. The instruction requirement determination portion 14 reads N=1 from the memory and directs the instruction information display portion 16 to display the first page of the handling procedure instruction information. The instruction information display portion 16 then reads the first page of the handling procedure instruction information from the display information storage portion 18 and displays it on the monitor (step S203). The instruction requirement determination portion 14 then determines whether or not N is the maximum value (MAX), that is, N=5 (step S204). After step S204, the instruction information display portion 16 continues to display the handling procedure instruction information displayed in step S203 until it accepts an input of a command to change to the next page of the handling procedure instruction information. If it determines in step S204 that not N=5, that is, the page is not the last page, the instruction requirement determination portion 14 determines whether or not an input of a command to change to the next page of the handling procedure instruction information is accepted (step S205). If the command to change pages is not accepted, the instruction requirement determination portion 14 shifts the process to step S202; if the direction to change is accepted, it performs the process of N=N+1 (step S206) and shifts the process to step S202. It then repeats the processes from step S202 through S206 until it is determined in step S202 that image data is recorded in the memory of the image taking device 2 or is de mined in step S204 that N=5.

If it determines in step S204 that N=5, that is, the last page is displayed, the instruction requirement determination portion 14 accesses the image taking device 2 via the cradle 3 and determines whether or not image data is recorded in the memory of the image taking device 2 at regular time intervals (step S207). It repeats the determination until image data is recorded. If it determines that image data is recorded in the memory of the image taking device 2, the instruction requirement determination portion 14 directs the instruction information display portion 16 to display the information to be displayed after the handling procedure instruction information. The instruction information display portion 16 reads the information to be displayed after the handling procedure instruction information from the display information storage portion 18 and displays it on the monitor (step S208). Moreover, the image capture processing portion 17 displays on the monitor the information indicating that the image data is being transferred to the terminal 1 (step S209), and accepts the transfer of the image data from the image taking device 2 (step S210).

According to the processes from step S201 through S210, if it is determined in step S202 that image data has already been recorded in the memory of the image taking device 2, the process is shifted to the process of step S208 without displaying the pages of the handling procedure instruction information to be displayed after the page then displayed on the monitor (in other words, by skipping the display of the handling procedure instruction information), and the information to be displayed after the handling procedure instruction information is displayed on the monitor. As a result, the information to be displayed after the handling procedure instruction information can be displayed to a user who is familiar with the handling procedure of the image taking device 2, without the display the handling procedure instruction information. Therefore, the burden of the user to operate on the terminal 1 (handling procedure instruction device) (the effort to input change to the next page) can be reduced. On the other hand, if the user does not know the operation procedure of the image taking device 2, the user can operate the image taking device according to the handling procedure instruction information. The handling procedure instruction information is displayed without being skipped. The time to skip from the process of step S202 to S208 is either when it is found that image data has already been recorded in the memory of the image taking device 2 before the first page of the handling procedure instruction information is displayed on the monitor or when image data is recorded in the memory of the image taking device 2 before the fifth page (the last page) is displayed (when the user takes a picture of an object and connects the image taking device 2 with the cradle 3 before checking until the last page).

In the second embodiment, the terminal 1 provided with the function of a handling procedure instruction device determines whether or not it is required to display the information to be displayed after the handling procedure instruction information based on whether or not image data is stored in the memory of the image taking device 2. However, in the case of electronic equipment other than the image taking device 2, it may be determined whether or not the handling procedure of the electronic equipment is known to the user who is handling the equipment based on whether or not information suitable for the electronic equipment is recorded in the electronic equipment; and then, based on this result, it may be determined whether or not to display the information to be displayed after the handling procedure instruction information. Furthermore, in the second embodiment, the last page of the handling procedure induction information is N=5. However, it is not limited to N=5. It is possible to select multiple a plurality of times the value of the maximum value MAX for N according to the number of pages required.

Figure 7:
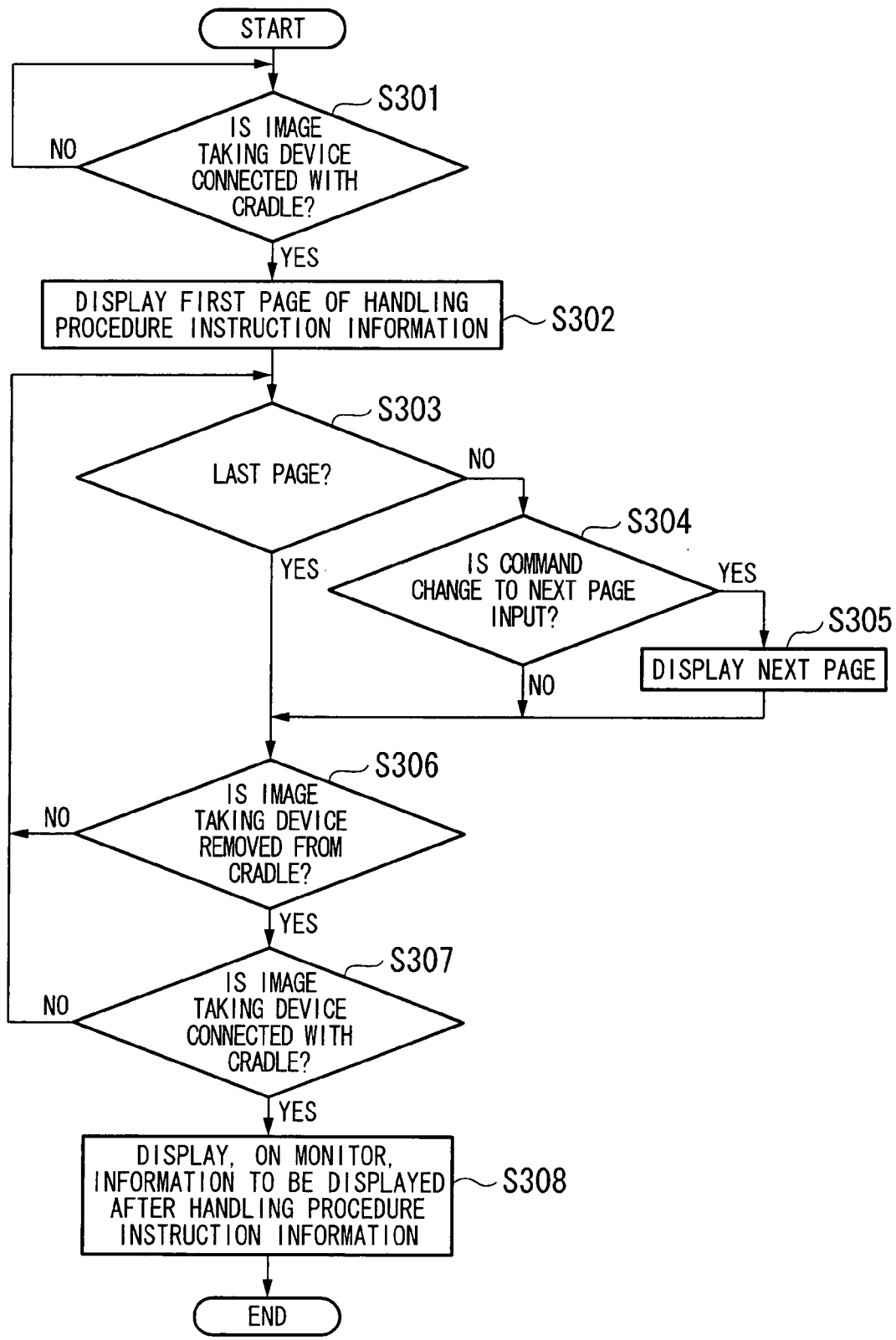
FIG. 7 is a diagram showing a process flow of a terminal according to a third embodiment.

FIG. 7 is a diagram showing a process flow of a terminal according to a third embodiment.

Next is a sequential description of a process flow of a terminal provided with the function of the handling procedure instruction device according to the third embodiment with reference to FIG. 7. The terminal 1 of the third embodiment has the similar function portions as those of the terminal 1 of the first embodiment. Therefore, the individual functional portions will be denoted by the same reference symbols as those in the first embodiment.

First, the connection detection portion 13 of the terminal 1 determines whether or not the image taking device 2 is connected with the cradle 3 (step S301). It repeats the determination of step S301 until it determines that the image taking device 2 is connected with the cradle 3. Next, if the image taking device 2 is connected with the cradle 3, the instruction requirement determination portion 14 directs the instruction information display portion 16 to display the handling procedure instruction information. The instruction information display portion 16 then reads the first page of the handling procedure instruction information from the display information storage portion 18 and displays it on the monitor (step S302).

Next, the instruction requirement determination portion 14 determines whether or not the page of the handling procedure instruction information displayed on the monitor is the last page (step S303). If it is not the last page, the instruction requirement determination portion 14 determines whether or not a change to the next page of the handling procedure instruction information has been directed (step S304). The instruction information display portion 16 continues to display the page displayed in step S302 until the direction to change to the next page of the handling procedure instruction information comes.

In step S304, if it is determined that no change in the handling procedure instruction information has been directed, the instruction requirement determination portion 14 subsequently determines whether or not the image taking device 2 is removed from the cradle 3 (step S306). In step S306, if the instruction requirement determination portion 14 determines that the image taking device 2 is removed from the cradle 3, it is determined that the user is going to use the image taking device 2 to capture the image. After completion of capturing the image, the user connects the image taking device 2 with the cradle 3 in order to transfer the image data to the terminal 1. Then, the instruction requirement determination portion 14 determines whether or not the image taking device 2 is connected with the cradle 3 (step S307). If it determines that the image taking device 2 is connected with the cradle 3, the instruction requirement determination portion 14 determines that it is not necessary to display the handling procedure instruction information, and directs the instruction abortion processing portion 15 to abort the handling procedure instruction information. The instruction abortion processing portion 15 then directs the instruction information display portion 16 to display the information to be displayed after the handling procedure instruction information, for example the display of the information of the screen that prompts the start of an image capture. For example, suppose that while the first page of the handling procedure instruction information is displayed, the image taking device 2 is removed from the cradle 3 and an image capturing is performed. After that, if the user connects the image taking device 2 with the cradle 3, the display of the first page of the handling procedure instruction information turns to the display of the information of the screen that prompts the start of an image capture.

That is, the second page through the fifth page of the handling procedure instruction information are not displayed (In the present embodiment, the last page is supposed to be the fifth page. However, the number of pages is not limited to this value.).

In this manner, for a user who is familiar with the handling procedure of the image taking device 2, the burden for operation on the terminal 1 (handling procedure instruction device) (for example, operation of inputting change to the next page) can be reduced because the display of the handling procedure instruction information is skipped.

If the image taking device 2 is not detached from and attached to the cradle 3 (No in step S306 and No in step S307), the instruction information display portion 16 continues to display the page displayed in step S302 or step S305 until the command to change to the next page of the handling procedure instruction information comes. Moreover, in step S304, if it is determined that the change to the next page of the handling procedure instruction information is input, the instruction requirement determination portion 14 directs the instruction information display portion 16 to display the next page of the handling procedure instruction information. The instruction information display portion 16 then reads the next page of the handling procedure instruction information from the display information storage portion 18 and displays it on the monitor (step S305). Then, as described above, the individual determinations and the processes according to their results are performed.

Furthermore, in step S303, if the instruction requirement determination portion 14 determines that it is the last page, all the handling instructions are over. Therefore, the next step is only for the user to use the image taking device 2 to take an image. For this reason, the instruction information display portion 16 keeps on displaying the last page of the handling procedure instruction information until the image taking device 2 is removed from the cradle 3.

Similarly, the instruction information display portion 16 continues to display the last page of the handling procedure instruction information until the image taking device 2 is connected with the cradle 3. On detecting that the image taking device 2 is connected with the cradle 3, the instruction requirement determination portion 14 directs the instruction information display portion 16 to display the information to be displayed after the handling procedure instruction information. The instruction information display portion 16 then reads the information to be displayed after the handling procedure instruction information from the display information storage portion 18 and displays it on the monitor (step S308).

According to the processes from step S301 to S308, by detecting that the image taking device 2 is removed from the cradle 3 and that the image taking device 2 is again connected with the cradle 3, the terminal 1 can determine that the user already knows the handling procedure of the image taking device 2. Therefore, the terminal 1 can skip the handling procedure instruction information to display the information to be displayed after the handling procedure instruction information even before the handling procedure instruction information is displayed through to its last page. As a result, the information to be displayed after the handling procedure instruction information can be displayed without the user sequentially inputting the page changes through to the last page. Therefore, the burden of the user to operate on the terminal 1 (handling procedure instruction device) (the effort to input change to the next page) can be reduced. That is, only one operation of removing the image taking device 2 from the cradle 3 allows the user to shift to a shooting of an object and at the same time to send to the terminal 1 a signal indicating that the display of the handling procedure instruction information is not required. This eliminates the necessity for the user to newly issue the direction to skip the display of the handling procedure instruction information of the image taking device 2. Therefore, the burden of the user to operate on the terminal 1 can be reduced. On the other hand, if the user does not know the operation procedure of the image taking device 2, the user can operate according to the handling procedure instruction information, and the handling procedure instruction information can be displayed without being skipped.

In the third embodiment, the terminal 1 provided with the function of a handling procedure instruction device determines whether or not it is required to display the information to be displayed after the handling procedure instruction information based on whether or not the image taking device 2 is removed from the cradle 3. In the case of electronic equipment other than the image taking device 2, it may be determined whether or not the handling procedure of the electronic equipment is known to the user who handles the equipment based on whether or not the image taking device 2 is removed from equipment suitable for the electronic equipment; and then, based on this result, it may be determined whether or not to display the information to be displayed after the handling procedure instruction information.

Figure 8:
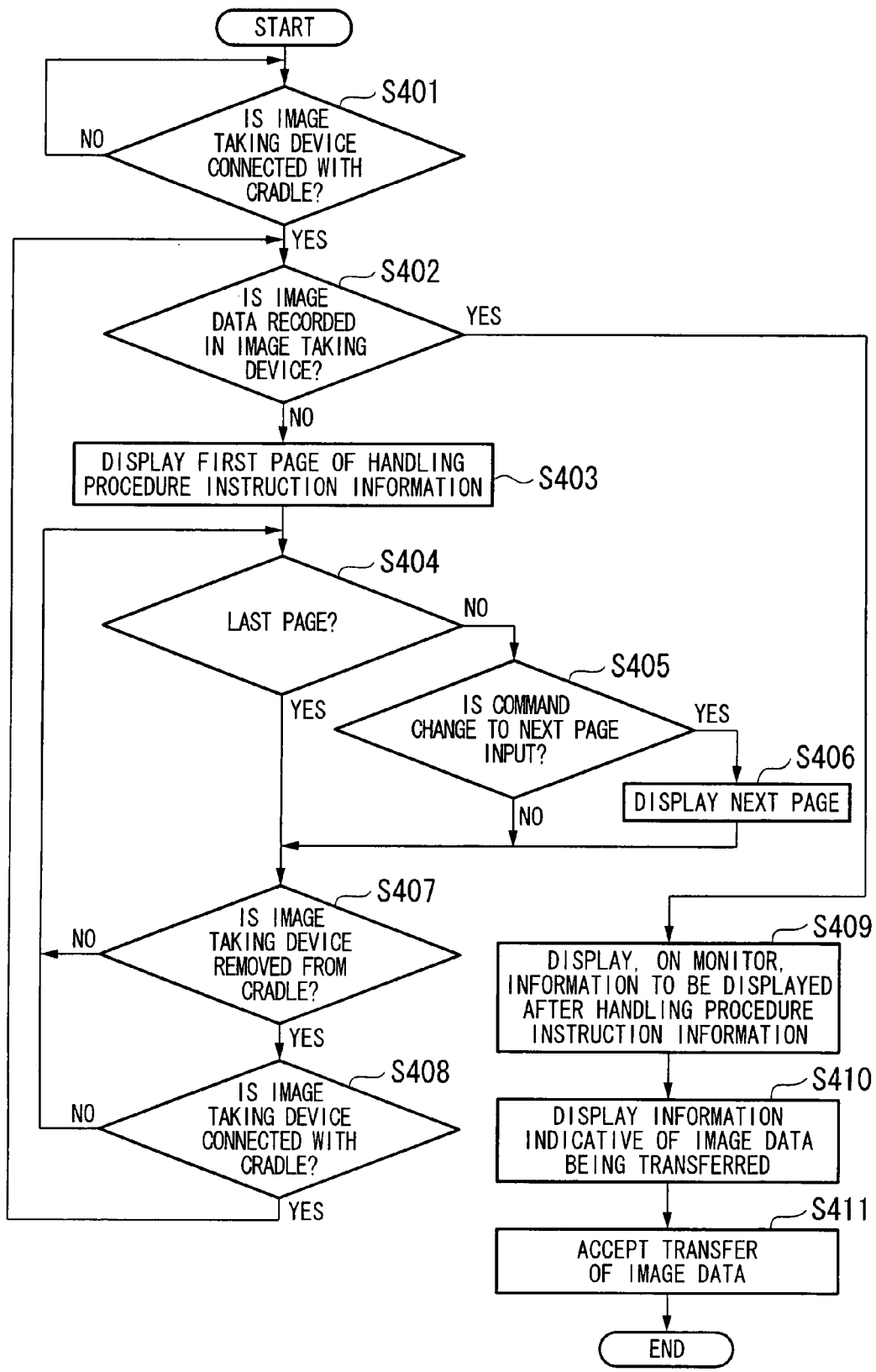
FIG. 8 is a diagram showing a process flow of a terminal according to a fourth embodiment.

FIG. 8 is a diagram showing a process flow of a terminal according to a fourth embodiment.

Next is a sequential description of a process flow of a terminal provided with the function of the handling procedure instruction device according to the fourth embodiment with reference to FIG. 8. The terminal 1 of the fourth embodiment has similar function portions as those of the terminal 1 of the first embodiment. Therefore, the individual functional portions will be denoted by the same reference symbols as those in the first embodiment.

First, the connection detection portion 13 of the terminal 1 determines whether or not the image taking device 2 is connected with the cradle 3 (step S401). It repeats the determination of step S401 until it determines that the image taking device 2 is connected with the cradle 3. Next, if the image taking device 2 is connected with the cradle 3, the instruction requirement determination portion 14 of the terminal 1 accesses the image taking device 2 via the cradle 3 and then determines whether or not image data is recorded in the memory of the image taking device 2 (step S402). Note that the number of accesses to the image taking device 2 may be one, or a plurality of times at predetermined time intervals.

The case in which it is determined in the determination of step S402 that image data is recorded in the memory of the image taking device 2 will be further described. If image data is recorded in the memory of the image taking device 2, it indicates that the user has used the image taking device 2. Therefore, it is possible to determine that the user is familiar with how to use the image taking device 2. For this reason, the terminal 1 directs the instruction abortion processing portion 15 to abort the handling procedure instruction information. The instruction abortion processing portion 15 then directs the instruction information display portion 16 to display the information to be displayed after the handling procedure instruction information, for example the display of the information of the screen that prompts the start of an image capture. The instruction information display portion 16 then reads the information to be displayed after the handling procedure instruction information from the display information storage portion 18 and displays it on the monitor (step S409). Moreover, the image capture processing portion 17 displays on the monitor the information indicating that the image data is being transferred to the terminal 1 (step S410), and accepts the transfer of the image data from the image taking device 2 (step S411).

In this manner, for a user who is familiar with the handling procedure of the image taking device 2, the burden for operation on the terminal 1 (handling procedure instruction device) (for example, operation of inputting change to the next page) can be reduced because the display of the handling procedure instruction information is skipped.

Next is a description of the case where it is determined in the determination of step S402 that image data is not recorded in the memory of the image taking device 2. The instruction requirement determination portion 14 directs the instruction information display portion 16 to display the handling procedure instruction information. The instruction information display portion 16 then reads the first page of the handling procedure instruction information from the display information storage portion 18 and displays it on the monitor (step S403).

Next, the instruction requirement determination portion 14 determines whether or not the page of the handling procedure instruction information displayed on the monitor is the last page (step S404). If it is not the last page, the instruction requirement determination portion 14 determines whether or not the change to the next page of the handling procedure instruction information is directed (step S405). The instruction information display portion 16 keeps on displaying the handling procedure instruction information displayed in step S403 until the direction to change to the next page of the handling procedure instruction information comes.

In step S405, if it is determined that no change in the handling procedure instruction information has been directed, the instruction requirement determination portion 14 subsequently determines whether or not the image taking device 2 is removed from the cradle 3 (step S407). In step S407, if instruction requirement determination portion 14 determines that the image taking device 2 is removed from the cradle 3, it is detected that the user is going to use the image taking device 2 to capture an image. After completion of capturing the image, the user connects the image taking device 2 with the cradle 3 in order to transfer the image data to the terminal 1. Then, the instruction requirement determination portion 14 determines whether or not the image taking device 2 is connected with the cradle 3 (step S408). If it is determined that the image taking device 2 is connected with the cradle 3, the instruction requirement determination portion 14 determines that it is not necessary to display the handling procedure instruction information, and shifts the process to step S402. For example, suppose that while the first page of the handling procedure instruction information is displayed, the image taking device 2 is removed from the cradle 3 and an image is captured. After that, when the user connects the image taking device 2 with the cradle, the instruction requirement determination portion 14 shifts the process to step S402. It then shifts the process from step S402 to step S409 because image data is recorded in the image taking device 2. In other words, the display of the first page of the handling procedure instruction information turns to the display of the information to be displayed after the handling procedure instruction information.

That is, the second through the fifth pages of the handling procedure instruction information are not displayed. (In the present embodiment, the last page is supposed to be the fifth page. However, the number of pages is not limited to this value.)

In this manner, for a user who is familiar with the handling procedure of the image taking device 2, the effort for operation on the terminal 1 (handling procedure instruction device) (for example, operation of inputting change to the next page) can be reduced because the display of the handling procedure instruction information is skipped.

If the image taking device 2 is not detached from and attached to the cradle 3 (No in step S407 and No in step S408), the instruction information display portion 16 keeps on displaying the page displayed in step S402 or step S406 until the direction to change to the next page of the handling procedure instruction information comes.

Moreover, in step S405, if it is determined that the change to the next page of the handling procedure instruction information is input, the instruction requirement determination portion 14 directs the instruction information display portion 16 to display the next page of the handling procedure instruction information. The instruction information display portion 16 then reads the next page of the handling procedure instruction information from the display information storage portion 18 and displays it on the monitor (step S406). Then, as described above, the individual determinations and the processes according to their results are performed.

Furthermore, in step S404, if the instruction requirement determination portion 14 determines that it is the last page, all the handling instructions are over. Therefore, the next step is only for the user to use the image taking device 2 to capture an image. For this reason, the instruction information display portion 16 continues to display the last page of the handling procedure instruction information until the image taking device 2 is removed from the cradle 3. Similarly, the instruction information display portion 16 continues to display the last page of the handling procedure instruction information until the image taking device 2 is connected with the cradle 3. When it detects that the image taking device 2 is connected with the cradle 3, the instruction requirement determination portion 14 shifts the process to step S402. It then repeats the processes from step S402 through S408 until it is determined in step S402 that image data is recorded in the memory of the image taking device 2.

According to the processes from step S401 through S411, if it is determined in step S402 that image data has already been recorded in the memory of the image taking device 2, the process is shifted to the process of step S409 without displaying the pages to be displayed after the page of the handling procedure instruction information then displayed on the monitor (in other words, by skipping the display of the handling procedure instruction information), and the information to be displayed after the handling procedure instruction information is displayed on the monitor. As a result, the information to be displayed after the handling procedure instruction information can be displayed to a user who is familiar with the handling procedure of the image taking device 2 without the display of the handing procedure instruction information Therefore, the effort of the user to operate on the terminal 1 (handling procedure instruction device) (the effort to input change to the next page) can be reduced.

According to the processes from step S401 to S411, by detecting that the image taking device 2 is removed from the cradle 3 and that the image taking device 2 is again connected with the cradle 3, the terminal 1 can determine that the user already knows the handling procedure of the image taking device 2. Therefore, the terminal 1 can skip the handling procedure instruction information even before the handling procedure instruction information is displayed through to its last page. As a result, it is possible to determine that the user already knows the handling procedure of the image taking device 2 without the user sequentially inputting the page changes through to the last page. Therefore, the burden of the user to operate on the terminal (handling procedure instruction device) (the effort to input change to the next page) can be reduced. That is, only one operation of removing the image taking device 2 from the cradle 3 allows the user to shift to capture an image of an object and at the same time to send to the terminal 1 a signal indicating that the display of the handling procedure instruction information is not required. This eliminates the necessity for the user to newly issue the direction to skip the display of the handling procedure instruction information of the image taking device 2. As a result, the burden of the user to operate on the terminal 1 can be reduced. On the other hand, if the user does not know the operation procedure of the image taking device 2, the user can operate according to the handling procedure instruction information, and the handling procedure instruction information can be displayed without being skipped.

In the fourth embodiment, the terminal 1 provided with the function of a handling procedure instruction device determines whether or not it is required to display the information to be displayed after the handling procedure instruction information based on whether or not image data is stored in the image taking device 2. However, in the case of electronic equipment other than the image taking device 2, it may be determined whether or not the handling procedure of the electronic equipment is known to the user who handles the equipment based on whether or not information suitable for the electronic equipment is recorded in the electronic equipment; and then, based on this result, it may be determined whether or not to display the information to be displayed after the handling procure instruction information.

The terminal provided with the function of a handling procedure instruction device and the image taking device, as shown in all the embodiments described above, have a computer system inside them. The flows of the processes described above are embodied on a computer readable recording medium in the form of a program. The above processes are performed by the computer reading and running the program. Here, the computer readable recording medium may be a magnetic disk, optical magnetic disk, CD-ROM, DVD-ROM, semiconductor memory, or the like. Moreover, the computer program may be distributed to a computer via a communication line and may be run by the computer which has received the distribution.

The above program may be for implementing a part of the above-mentioned functions.

Furthermore, it may be one that can implement the above-mentioned functions in combination with a program already recorded in the computer system, in other words, a difference file (difference program).

According to the present invention, the handling procedure instruction device displays information to be displayed after the handling procedure instruction information if it determines that it is not necessary to display the handling procedure instruction information. This can reduce burden on the user to operate the handling procedure instruction device in the case where the user is familiar with the equipment.

Furthermore, according to the present invention, the handling procedure instruction device skips the display of the handling procedure instruction information even while the handling procedure instruction information is displayed if it determines that it is not necessary to display the handling procedure instruction information for the user. This can reduce burden on the user to operate the handling procedure instruction device.

The invention claimed is:

1. A handling procedure instruction device for displaying previously-stored handling procedure instruction information of an equipment, the device comprising:
   an instruction requirement determinator that is configured to read information from the equipment indicating whether or not a handling procedure of the equipment is known to a user of the equipment to determine whether or not a handling instruction is required;
   an instruction abortion unit that aborts display processing of the previously-stored handling procedure instruction information if the information indicating that the handling procedure of the equipment is known to the user of the equipment is read; and
   a display processor that displays the handling procedure instruction information of the equipment on a display portion if the information indicating that the handling procedure of the equipment is known to the user of the equipment is not read, and that displays information to be displayed after the handling procedure instruction information on the display portion if the display processing of the handling procedure instruction information is aborted.

2. The handling procedure instruction device according to claim 1, further comprising:
   connection detector for determining whether or not the equipment is connected with the instruction device,
   wherein if the equipment is determined to be connected with the instruction device, the instruction requirement determinator reads the information from the equipment indicating whether or not the handling procedure of the equipment is known to the user of the equipment to determine whether or not the handling instruction is required.

3. The handling procedure instruction device according to claim 2,
   wherein if the information indicating that the handling procedure of the equipment is known to the user of the equipment cannot be read, then:
      the display processor displays the handling procedure instruction information;
      the connection detector detects a connection of the equipment to the instruction device, while the handling procedure instruction information is displayed; and
      the instruction requirement determinator determines toto read the information indicating whether or not the handling procedure of the equipment is known to the user of the equipment to determine whether or not the handling instruction is required, while the handling procedure instruction information is displayed, and
   wherein if the information indicating that the handling procedure of the equipment is known to the user is read while the handling procedure instruction information is displayed, then:
      the instruction abortion unit determines to abort displaying the handling procedure instruction information, and
      the display processor displays the information to be displayed after the handling procedure instruction information on the display portion.

4. A handling procedure instruction device for displaying previously-stored handling procedure instruction information of an equipment, the device comprising:
   an instruction requirement determinator that is configured to read information from the equipment indicating whether or not a handling procedure of the equipment is known to a user of the equipment to determine whether or not a handling instruction is required;
   an instruction abortion unit that aborts display processing of the previously-stored handling procedure instruction information if the information indicating that the handling procedure of the equipment is known to the user of the equipment is read;
   a display processor that displays information to be displayed after the handling procedure instruction information on a display portion if the display processing of the handling procedure instruction information is aborted; and
   a connection detector for determining whether or not the equipment is connected with the instruction device,
   wherein if the equipment is connected with the instruction device, the instruction requirement determinator reads from the equipment the information indicating whether or not the handling procedure of the equipment is known to the user of the equipment to determine whether or not the handling instruction is required,
   wherein if the information indicating that the handling procedure of the equipment is known to the user of the equipment cannot be read, then:
      the display processor displays the handling procedure instruction information;
      the connection detector detects a connection of the equipment to the instruction device, while the handling procedure instruction information is displayed; and
      the instruction requirement determinator determines to read the information indicating whether or not the handling procedure of the equipment is known to the user of the equipment to determine whether or not the handling instruction is required, while the handling procedure instruction information is displayed,
   wherein if the information indicating that the handling procedure of the equipment is known to the user is read while the handling procedure instruction information is displayed, then:
      the instruction abortion unit determines to abort displaying the handling procedure instruction information, and
      the display processor displays the information to be displayed after the handling procedure instruction information on the display portion, and
   wherein if the connection detector detects removal of the equipment from the instruction device while the handling procedure instruction information is displayed, the instruction abortion unit decides to abort displaying the handling procedure instruction information.

5. A handling procedure instruction device for displaying previously-stored handling procedure instruction information of an image taking device, the instruction device comprising:
   an instruction requirement determinator that is configured to determine whether or not an image is recorded in the image taking device to decide whether or not a handling instruction is required;
   an instruction abortion unit that aborts display processing of the previously-stored handling procedure instruction information if the image is determined to be recorded in the image taking device; and
   a display processor that displays the handling procedure instruction information of the image taking device on a display Portion if the image is determined to be not recorded in the image taking device and that displays information to be displayed after the handling procedure instruction information on the display portion if the display processing of the handling procedure instruction information is aborted.

6. The handling procedure instruction device according to claim 5, further comprising:
   a connection detector that determines whether or not the image taking device is connected with the instruction device, and
   wherein the instruction requirement determinator determines whether or not the image is recorded in the image taking device to decide whether or not the handling instruction is required, if the image taking device is determined to be connected with the instruction device.

7. The handling procedure instruction device according to claim 6,
   wherein if no image is recorded in the image taking device, then:
      the display processor displays the handling procedure instruction information;

the connection detector detects a connection of the image taking device to the instruction device, while the handling procedure instruction information is displayed; and the instruction requirement determinator determines whether or not the image is recorded in the image taking device to decide whether or not the handling instruction is required, while the handling procedure instruction information is displayed, and wherein if the image is determined to be recorded in the image taking device while the handling procedure instruction information is displayed, then:

the instruction abortion unit determines to abort display of the previously-stored handling procedure instruction information, and the display processor displays, on the display portion, the information to be displayed after the handling procedure instruction information.

8. A handling procedure instruction device for displaying previously-stored handling procedure instruction information of an image taking device, the instruction device comprising:

an instruction requirement determinator that is configured to determine whether or not an image is recorded in the image taking device to decide whether or not a handling instruction is required;

an instruction abortion unit that aborts display processing of the previously-stored handling procedure instruction information if the image is determined to be recorded in the image taking device;

a display processor that displays information to be displayed after the handling procedure instruction information on a display portion if the display processing of the handling procedure instruction information is aborted; and a connection detector that determines whether or not the image taking device is connected with the instruction device, wherein the instruction requirement determinator determines whether or not the image is recorded in the image taking device to decide whether or not the handling instruction is required, if the image taking device is connected with the instruction device, wherein if no image is determined to be recorded in the image taking device, then:

the display processor displays the handling procedure instruction information;

the connection detector detects a connection of the image taking device to the instruction device, while the handling procedure instruction information is displayed; and the instruction requirement determinator determines whether or not the image is recorded in the image taking device to decide whether or not the handling instruction is required, while the handling procedure instruction information is displayed, wherein if the image is determined to be recorded in the image taking device while the handling procedure instruction information is displayed, then:

the instruction abortion unit determines to abort display of the previously-stored handling procedure instruction information, and the display processor displays, on the display portion, the information to be displayed after the handling procedure instruction information, and wherein if the connection detector detects removal of the image taking device from the instruction device while the handling procedure instruction information is displayed, the instruction abortion unit decides to abort displaying the handling procedure instruction information.

9. A method of instructing a handling procedure in a handling procedure instruction device for displaying previously-stored handling procedure instruction information of an equipment, the method comprising:

reading information from the equipment indicating whether or not the handling procedure of the equipment is known to a user of the equipment to determine whether or not a handling instruction is required, aborting display processing of the previously-stored handling procedure instruction information if the information indicating that the handling procedure of the equipment is known to the user of the equipment is read, displaying the handling procedure instruction information of the equipment on a display portion of the handling procedure instruction device if the information indicating that the handling procedure of the equipment is known to the user of the equipment is not read, and displaying information to be displayed after the handling procedure instruction information on the display portion if the display processing of the handling procedure instruction information is aborted.

10. The method of instructing the handling procedure according to claim 9, further comprising:

determining whether or not the equipment is connected with the handling procedure instruction device, wherein the reading of the information from the equipment indicating whether or not the handling procedure of the equipment is known to the user of the equipment to determine whether or not the handling instruction is required, is performed if it is determined that the equipment is connected with the handling procedure instruction device.

11. The method of instructing the handling procedure according to claim 10, wherein if the information indicating that the handling procedure of the equipment is known to the user of the equipment cannot be read, then:

the handling procedure instruction information is displayed;

a connection of the equipment to the instruction device is detected while the handling procedure instruction information is displayed; and the information indicating whether or not the handling procedure of the equipment is known to the user of the equipment is read from the equipment to determine whether or not the handling instruction is required, while the handling procedure instruction information is displayed, wherein if the information indicating that the handling procedure of the equipment is known to the user of the equipment is read while the handling procedure instruction information is displayed, then:

the display of the handling procedure instruction information is aborted, and the information to be displayed after the handling procedure instruction information is displayed on the display portion.

12. A method of instructing a handling procedure in a handling procedure instruction device for displaying previously-stored handling procedure instruction information of an equipment, the method comprising:

reading information indicating whether or not the handling procedure of the equipment is known to a user of the equipment to determine whether or not a handling instruction is required, aborting display processing of the previously-stored handling procedure instruction information if the information indicating that the handling procedure of the equipment is known to the user of the equipment is read, displaying information to be displayed after the handling procedure instruction information on a display portion if the display processing of the handling procedure instruction information is aborted, and determining whether or not the equipment is connected with the handling procedure instruction device, wherein the reading of the information from the equipment indicating whether or not the handling procedure of the equipment is known to the user of the equipment to determine whether or not the handling instruction is required, is performed if it is determined that the equipment is connected with the handling procedure instruction device, wherein if the information indicating that the handling procedure of the equipment is known to the user of the equipment cannot be read, then:
  the handling procedure instruction information is displayed;
  a connection of the equipment to the instruction device is detected while the handling procedure instruction information is displayed; and
  the information indicating whether or not the handling procedure of the equipment is known to the user of the equipment is read from the equipment to determine whether or not the handling instruction is required, while the handling procedure instruction information is displayed, wherein if the information indicating that the handling procedure of the equipment is known to the user of the equipment is read while the handling procedure instruction information is displayed, then:
  the display of the handling procedure instruction information is aborted, and
  the information to be displayed after the handling procedure instruction information is displayed on the display portion, and wherein if removal of the equipment from the instruction device is detected while the handling procedure instruction information is displayed, the display of the handling procedure instruction information is aborted.

13. A non-transitory computer readable recording medium having stored thereon a program of a handling procedure instruction device for displaying previously-stored handling procedure instruction information of an equipment, the program being executable by a computer of the handling procedure instruction device to perform functions comprising:
  reading information from the equipment indicating whether or not a handling procedure of the equipment is known to a user of the equipment to determine whether or not a handling instruction is required;
  aborting display processing of the previously-stored handling procedure instruction information if the information indicating that the handling procedure of the equipment is known to the user of the equipment is read;
  displaying the handling procedure instruction information of the equipment on a display portion of the handling procedure instruction device if the information indicating that the handling procedure of the equipment is known to the user of the equipment is not read; and
  displaying information to be displayed after the handling procedure instruction information on the display portion if the display processing of the handling procedure instruction information is aborted.

14. The non-transitory computer readable recording medium according to claim 13, further comprising:
  determining whether or not the equipment is connected with the instruction device,
  wherein the reading of the information from the equipment indicating whether or not the handling procedure of the equipment is known to the user of the equipment to determine whether or not the handling instruction is required, is performed if it is determined that the equipment is connected with the handling procedure instruction device.

15. The non-transitory computer readable recording medium according to claim 14,
  wherein if the information indicating that the handling procedure of the equipment is known to the user of the equipment cannot be read, then:
    the handling procedure instruction information is displayed;
    a connection of the equipment to the instruction device is detected while the handling procedure instruction information is displayed; and
    the information indicating whether or not the handling procedure of the equipment is known to the user of the equipment is read from the equipment to determine whether or not the handling instruction is required, while the handling procedure instruction information is displayed,
  wherein if the information indicating that the handling procedure of the equipment is known to the user of the equipment is read while the handling procedure instruction information is displayed, then:
    the display of the handling procedure instruction information is aborted, and
    the information to be displayed after the handling procedure instruction information is displayed on the display portion.

16. A non-transitory computer readable recording medium having stored thereon a program of a handling procedure instruction device for displaying previously-stored handling procedure instruction information of an equipment, the program being executable by a computer of the handling procedure instruction device to perform functions comprising:
  reading information indicating whether or not the handling procedure of the equipment is known to a user of the equipment to determine whether or not a handling instruction is required,
  aborting display processing of the previously-stored handling procedure instruction information if the information indicating that the handling procedure of the equipment is known to the user of the equipment is read,
  displaying information to be displayed after the handling procedure instruction information on a display portion of the handling procedure instruction device if the display processing of the handling procedure instruction information is aborted, and
  determining whether or not the equipment is connected with the handling procedure instruction device,
  wherein the reading of the information from the equipment indicating whether or not the handling procedure of the equipment is known to the user of the equipment to determine whether or not the handling instruction is required, is performed if it is determined that the equipment is connected with the handling procedure instruction device, wherein if the information indicating that the handling procedure of the equipment is known to the user of the equipment cannot be read, then:
- the handling procedure instruction information is displayed;
- a connection of the equipment to the instruction device is detected while the handling procedure instruction information is displayed; and
- the information indicating whether or not the handling procedure of the equipment is known to the user of the equipment is read from the equipment to determine whether or not the handling instruction is required, while the handling procedure instruction information is displayed, wherein if the information indicating that the handling procedure of the equipment is known to the user of the equipment is read while the handling procedure instruction information is displayed, then:
- the display of the handling procedure instruction information is aborted, and
- the information to be displayed after the handling procedure instruction information is displayed on the display portion, and wherein if removal of the equipment from the instruction device is detected while the handling procedure instruction information is displayed, the display of the handling procedure instruction information is aborted.

* * * * *